US010137678B2

(12) United States Patent
Trowbridge

(10) Patent No.: US 10,137,678 B2
(45) Date of Patent: Nov. 27, 2018

(54) ELECTRICAL POWER SOURCE FOR A 3D PRINTED OBJECT

(71) Applicant: Disney Enterprises, Inc., Burbank, CA (US)

(72) Inventor: Robert Scott Trowbridge, La Canada, CA (US)

(73) Assignee: Disney Enterprises, Inc., Burbank, CA (US)

( * ) Notice: Subject to any disclaimer, the term of this patent is extended or adjusted under 35 U.S.C. 154(b) by 994 days.

(21) Appl. No.: 14/505,426

(22) Filed: Oct. 2, 2014

(65) Prior Publication Data

US 2016/0096330 A1    Apr. 7, 2016

(51) Int. Cl.
| | | |
|---|---|---|
| *B33Y 30/00* | (2015.01) | |
| *B33Y 10/00* | (2015.01) | |
| *B33Y 50/00* | (2015.01) | |
| *B29C 64/106* | (2017.01) | |
| *B29L 31/34* | (2006.01) | |

(52) U.S. Cl.
CPC ............ *B33Y 30/00* (2014.12); *B29C 64/106* (2017.08); *B33Y 10/00* (2014.12); *B33Y 50/00* (2014.12); *B29K 2995/0005* (2013.01); *B29L 2031/34* (2013.01)

(58) Field of Classification Search
CPC ........ B33Y 10/00; B33Y 50/00; B29C 64/106; B29C 64/386
See application file for complete search history.

(56) References Cited

U.S. PATENT DOCUMENTS

| | | | | |
|---|---|---|---|---|
| 2004/0107080 | A1* | 6/2004 | Deichmann | A61F 11/08 703/6 |
| 2013/0144566 | A1* | 6/2013 | De Biswas | G06T 17/005 703/1 |
| 2015/0287247 | A1* | 10/2015 | Willis | G06T 19/20 345/419 |

* cited by examiner

*Primary Examiner* — Christina A Johnson
*Assistant Examiner* — Xue H Liu
(74) *Attorney, Agent, or Firm* — Patent Ingenuity, P.C.; Samuel K. Simpson

(57) ABSTRACT

A process and apparatus integrate a first 3D object model with a second 3D object model to generate an integrated 3D printable model. The first 3D object model models a first object that is passive. The second 3D object model models an electrical power source receptacle that operably connects to an electrical power source that provides electrical power for operation of the first object. The process and apparatus print a 3D object based upon the 3D model.

10 Claims, 4 Drawing Sheets

ELECTRICAL POWER SOURCE FOR A 3D PRINTED OBJECT

BACKGROUND

1. Field

This disclosure generally relates to the field of printing configurations. More particularly, the disclosure relates to 3D printing configurations.

2. General Background

The field of 3D printing has allowed for the fabrication of physical goods such as toys, figurines, etc. with the use of a 3D printer. A computing device, e.g., a personal computer ("PC"), laptop, etc. typically obtains a 3D model of the object. The computing device then provides that 3D model to a 3D printer to reproduce the physical goods from the 3D model.

Current 3D printing configurations are limited to 3D printing passive objects, e.g., toys that remain stationary without interaction or external activation. Automated objects that perform certain actions automatically, e.g., moving, speaking, etc., are not easily reproduced by 3D printers. As a result, typical manufacturing processes that are less efficient than 3D printing for individual objects are currently used for manufacturing such objects with automated or electrically powered capabilities.

Therefore, current 3D printing configurations do not provide adequate 3D printing capabilities for printing objects that are electrically powered. A process for providing an electrical power source to a 3D printed object is needed to reproduce objects that require an electrical voltage.

SUMMARY

A process integrates a first 3D object model with a second 3D object model to generate an integrated 3D printable model. The first 3D object model models a first object that is passive. The second 3D object model models an electrical power source receptacle that operably connects to an electrical power source that provides electrical power for operation of the first object. The process prints a 3D object based upon the integrated 3D printable model. The process can be performed with or without printing the 3D object.

An apparatus comprises a material delivery mechanism comprising a conductive material and a nonconductive material. The apparatus also comprises at least one 3D printer head. Further, the apparatus comprises a processor that provides instructions to the at least one printer head to print a 3D object from the material delivery mechanism based upon an integrated 3D printable model that integrates a first 3D object model and a second 3D object model. The first 3D object model models a first object that is passive. The second 3D object model models an electrical power source receptacle that operably connects to an electrical power source that provides electrical power for operation of the first object.

A process integrates a first 3D object model with a second 3D object model to generate an integrated 3D printable model. The first 3D object model models a first object that is passive. The second 3D object model models a connector that operably connects to an external electrical power source that provides electrical power for operation of the first object. The process prints a 3D object based upon the integrated 3D printable model. The process can be performed with or without printing the 3D object.

An apparatus comprises a material delivery mechanism comprising a conductive material and a nonconductive material. The apparatus also comprises at least one 3D printer head. Further, the apparatus comprises a processor that provides instructions to the at least one printer head to print a 3D object from the material delivery mechanism based upon an integrated 3D printable model that integrates a first 3D object model with a second 3D object model to generate an integrated 3D printable model. The first 3D object model models a first object that is passive. The second 3D object model models a connector that operably connects to an external electrical power source that provides electrical power for operation of the first object.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

An electrical power source configuration is provided for 3D printed objects. The electrical power source configuration integrates two or more object models into a single printable 3D model. As an example, a first object model describes a first object, e.g., a toy, figurine, etc., that a user wants to 3D print. A second object model describes a second object, e.g., a battery compartment with connectors, that is configured to accommodate an electrical power source such as a battery. The electrical power source configuration integrates the second object model into the first object model to provide an integrated printable 3D model. As a result, a 3D printer performs 3D printing based on a single integrated printable 3D model to 3D print an object with integrated electrical power source capabilities. The integrated 3D model includes electrical power source information for including an electrical source in, or, providing electricity to the printed 3D object. In contrast with previous configurations that are directed toward 3D printing inert plastic objects, the electrical power source configuration 3D prints objects so that the objects are able to easily connect internally or externally to an electrical power source.

As an example, the electrical power source configuration is used to 3D print a toy that has electrical actuators for moving, speaking, lighting, communicating, etc. The toy is modeled to generate a 3D model information. Electrical power source information is included in that 3D model so that a 3D printer prints the toy with the electrical power source data. An example of electrical power source data is data for a battery compartment, e.g., dimensions, type of material, etc., that accommodates typical batteries. As another example, the electrical power source data is data for a battery compartment lid or cover that is placed over the battery compartment. As yet another example, the electrical power source data is data for the electrical contacts and conductors that conduct electricity from and between the batteries in the battery compartment and the intended destination for electricity in and/or on the 3D printed object, e.g., an actuator that moves a limb of the toy.

Figure 1:
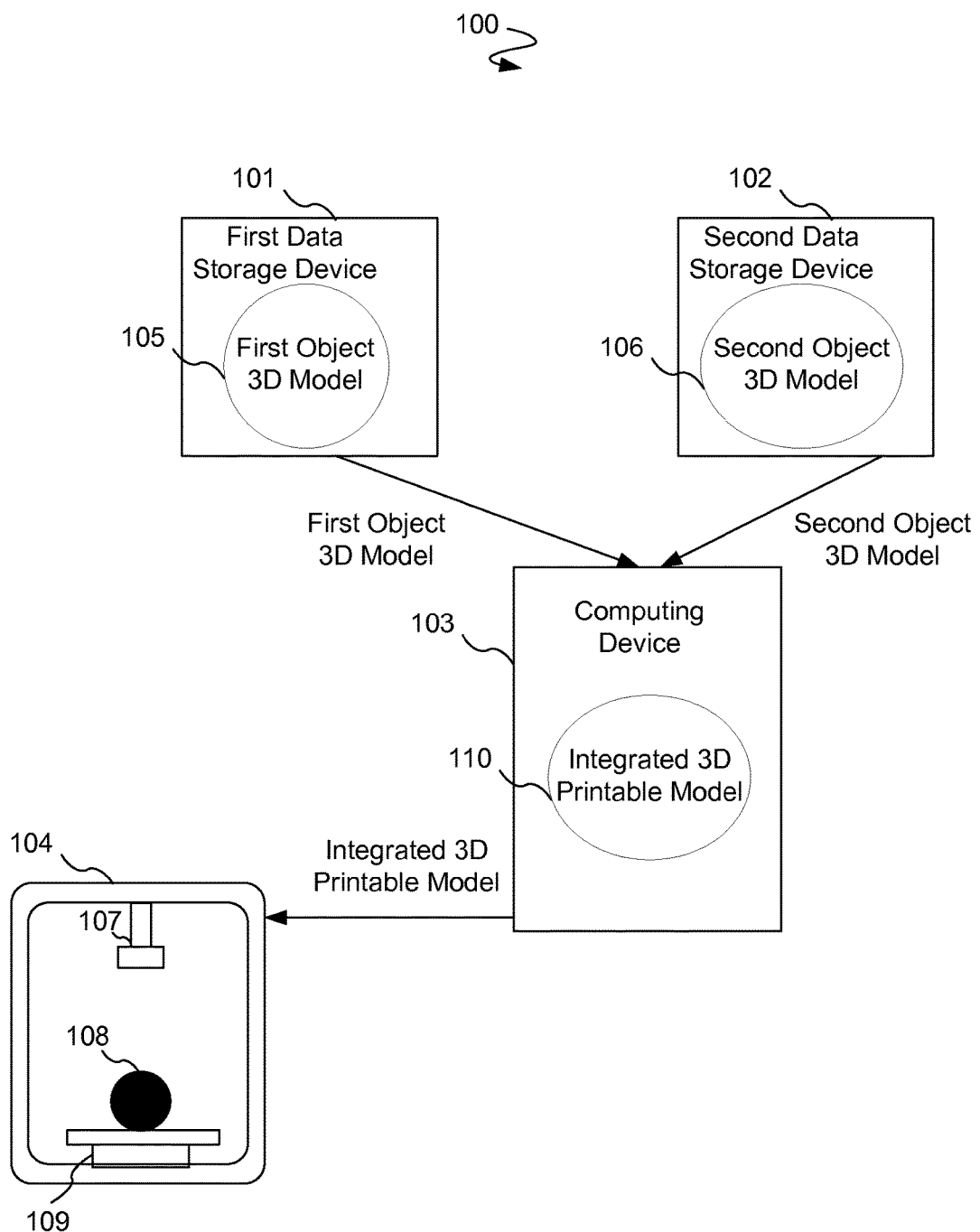
FIG. 1 illustrates a 3D printing electrical power source configuration.

FIG. 1 illustrates a 3D printing electrical power source configuration 100. The 3D printing electrical power source configuration includes a first data storage device 101, a second data storage device 102, a computing device 103, and a 3D printer 104.

In one implementation, the first data storage device 101 stores a first object 3D model 105 for a passive object, e.g., a toy, a figurine, etc. The second data storage device 102 stores a second object 3D model 106 for an electrical power source receptacle, electrical power source connector, or other electrical power source capability information. The data storage devices 101 and 102 are in operable communication with the computing device 103 to provide the respective 3D models to the computing device 103. The data storage devices 101 and 102 may be devices that interact locally with the computing device 103, e.g., USB devices, memory devices, etc., or devices that are stored on remote computing devices, e.g., servers, that interact remotely with the computing device 103. In another implementation, a single data storage device is used to store both the first object 3D model 105 and the second object 3D model 106. Further, more than two 3D object models can be used to model more than two objects for integration into a single 3D printable object 108. A single data storage device or multiple data storage devices may be used to store each of the 3D object models. In yet another implementation, a user can directly input the 3D models 105 and 106 at the computing device 103. As an example, the user draws the schematics for the 3D models 105 and 106 at the computing device 103 or captures images with an image capture device for input to the computing device 103.

After receiving the 3D models 105 and 106, the computing device 103, e.g., a personal computer ("PC"), laptop computer, tablet device, smartphone, etc., integrates the 3D models 105 and 106 into an integrated 3D printable model 110. In one implementation, the second object 3D model 106 is a predetermined model from the provider of that model. The computing device 103 integrates the predetermined model 106 with the first object 3D model 105 to generate the integrated 3D printable model 110. In another implementation, the computing device 103 determines the electrical power source requirements for the first object 3D model 105 and selects the second object 3D model 106 from a plurality of different possible models. As an example, the computing device 103 analyzes the first object 3D model 105 and determines that the power source requirements for powering the first object require a battery compartment that can accommodate two AA batteries having standard dimensions. The computing device 103 then selects the second object 3D model 106 based upon such power source requirements. The computing device 103 may have determined such power source requirements based upon a determination that the first object 3D model 105 only has a minimal quantity of lights and a minimal distance for the conductive pathways to reach the lights from the battery compartment. If the computing device 103 determines that the first object 3D model 105 required a significant quantity of lights at a significant distance from the battery compartment, the computing device 103 can automatically include more power requirements in the integrated 3D printable model 110. The computing device 103 also automatically determines optimal circuit pathways and includes such pathways in the integrated 3D printable model 110. Further, the computing device 103 determines weight distribution features. For example, the computing device 103 calculates the weight distribution effect that placement of a battery compartment towards the top of a toy would have as opposed to placement of the battery compartment towards the middle or bottom of the toy. For instance, placement of the battery compartment toward the top of a toy allows placement of batteries of a certain weight to be positioned in an area that would possibly allow the toy to tip over. In contrast, the computing device calculates a center of gravity weight distribution to place the batter compartment toward the middle or bottom of the toy to avoid such effect. In addition, the computing device 103 optimizes for aesthetic considerations. For example, the computing device 103 determines that a battery lid poisoned in the back of a toy is more aesthetic than a battery lid positioned in the head of the toy.

The computing device 103 integrates the first object 3D model 105 with the second object 3D model 106 by determining an optimal position for the electrical power source, e.g., a portion of the first object 3D model 105 with dimensions that would allow for positioning of the electrical power source receptacle or connector, e.g., battery compartment or plug, modeled by the second object 3D model 106 and enough proximity for electrical connections to the portion of the first object 3D model 105 to which the electrical power source provides power.

In one implementation, the computing device 103 sends the integrated 3D printable model 110 to the 3D printer 104 after integrating the second object 3D model 106 with the first object 3D model 105 to generate the integrated 3D printable model 110. The computing device 103 sends instructions to the 3D printer 104 to 3D print the 3D printable object 108, which is a replica of the first object modeled by the first object 3D model 105 with electrical power source data from the second object 3D model 106. The 3D printer 104 has a turntable 109 on which a material delivery mechanism, e.g., a multi-material spool, is placed. The material delivery mechanism has both nonconductive material and conductive material. The 3D printer 104 uses a printer head 107 to print the nonconductive portions of the object 108 with the nonconductive material of the material delivery mechanism and the conductive portions of the object 108 with the conductive material of the material delivery mechanism. The 3D printer 104 may use a single printer head 107 or multiple printer heads 107.

In another implementation, object models 105, 106, and any additional object models are preintegrated prior to being received by the computing device 103. As an example, a user or a computing device may preintegrate object models 105, 106, and any other object models into a single data file. That single data file is then sent to the computing device 103. The computing device 103 then sends the preintegrated object model to the 3D printer 104 with an instruction to 3D print the integrated 3D printable model 110. The computing device 103 may also perform integration of any object models that have not been preintegrated with the preintegrated object model to generate the 3D integrated printable model 110.

Figure 2:
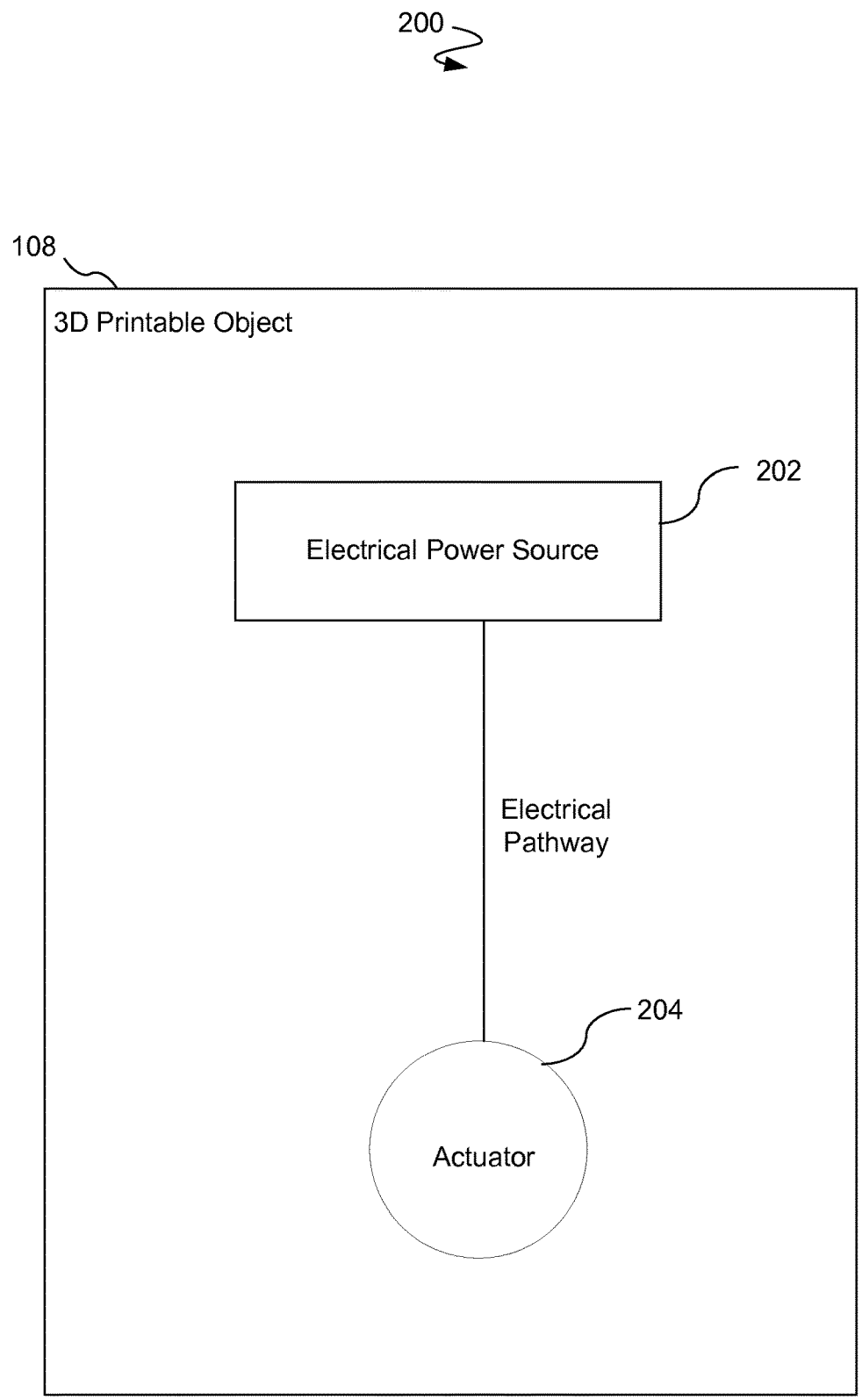
FIG. 2 illustrates an example of the object that was 3D printed by the 3D printer illustrated in FIG. 1.

FIG. 2 illustrates an example of the 3D printable object 108 that was 3D printed by the 3D printer 104 illustrated in FIG. 1. The 3D printable object 108 has an integrated electrical power source 202, e.g., a battery compartment. Further, the 3D printed object 108 is 3D printed with an electrical pathway to an actuator 204. As an example, the 3D printable object 108 is a toy that has an audio processor for communicating a message to the user after the user activates the actuator 204, e.g., presses a button to hear the audio message. The electrical pathway includes conductive pathways, electronic circuitry, contacts, conductors, etc. that are used to conduct electricity from and between the electrical power source 202 and the actuator 204.

A consumer is able to avoid having to purchase additional wires, objects, etc. for operation of the 3D printable object 108. The consumer purchases the 3D printable object 108 with an integrated electrical power source 202 that is operable after receiving power, e.g., placement of batteries into a battery compartment. Further, the user can easily replace the power source, e.g., replace the batteries.

Figure 3:
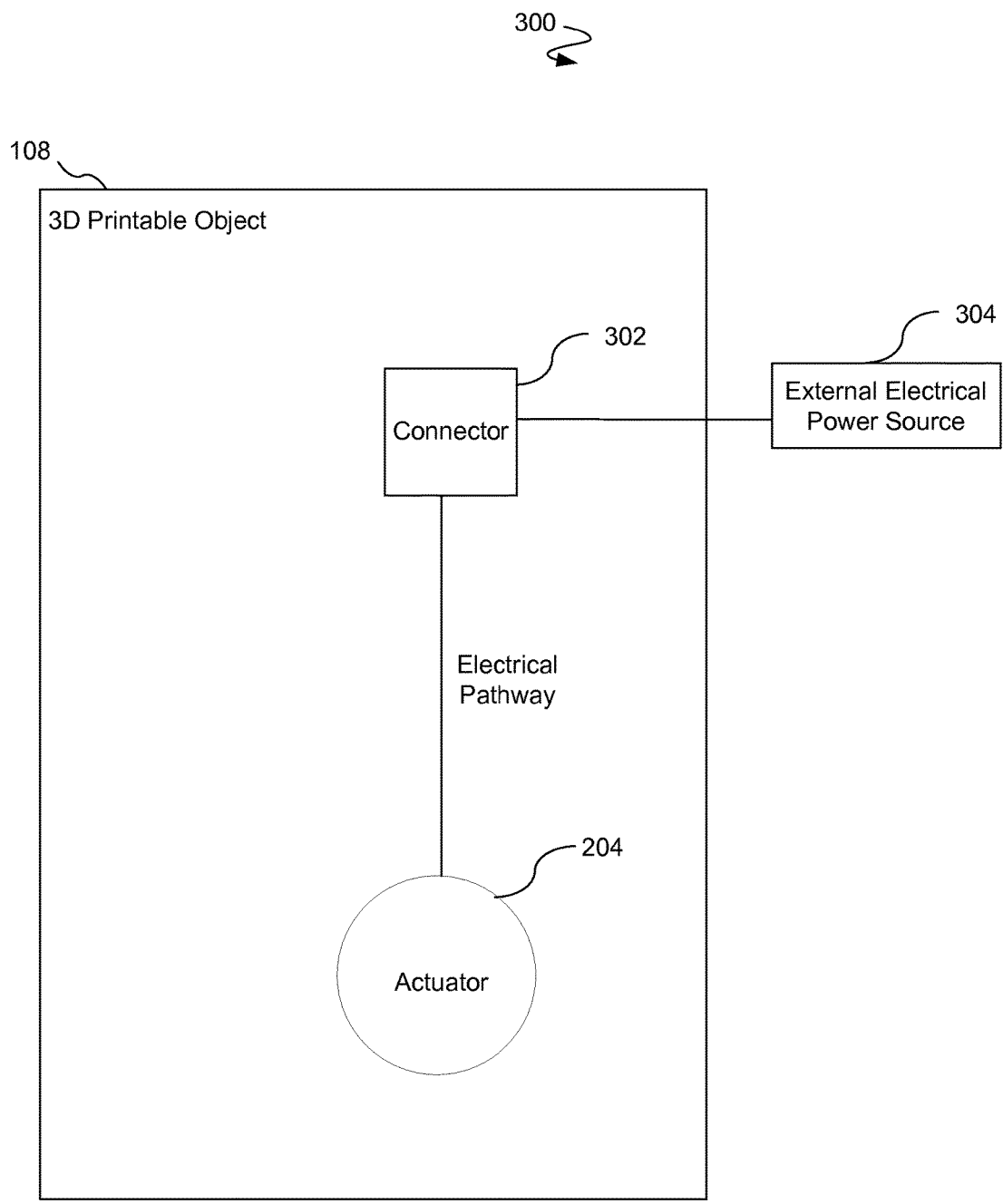
FIG. 3 illustrates another example of the object that was 3D printed by the 3D printer illustrated in FIG. 1.

FIG. 3 illustrates another example of the 3D printable object 108 that was 3D printed by the 3D printer 104 illustrated in FIG. 1. Rather than having an integrated electrical power source, the 3D printable object 108 can be 3D printed with a connector 302 that is integrated within the 3D printable object 108. The connector 302 is capable of interfacing with an external electrical power source 304. As an example, the connector 302 is a socket that interfaces with a matching plug of the power source 304. Conductive and insulating materials are used to 3D print the connector 302.

Figure 4:
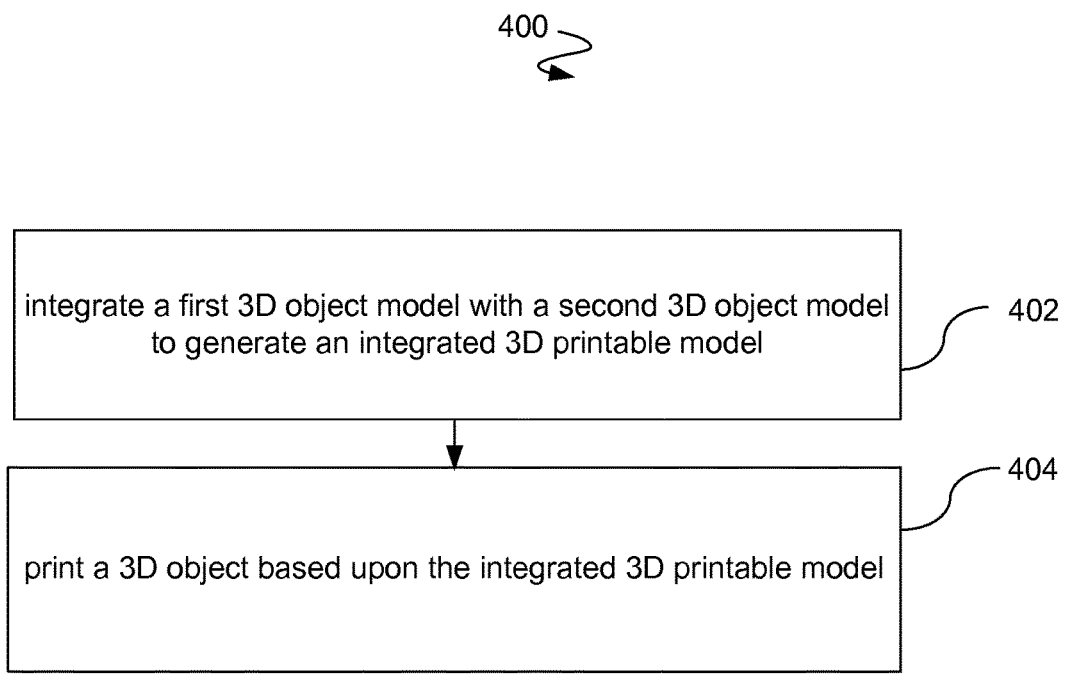
FIG. 4 illustrates a process that is used to 3D print an object with an electrical power source.

FIG. 4 illustrates a process 400 that is used to integrate a passive object model with an electrical power source connector model. At 402, the process integrates a first 3D object model with a second 3D object model to generate an integrated 3D printable model. The first object 3D model models a first object that is passive. The second 3D object model models an electrical power source receptacle or an electrical power source connector that operably connects to an electrical power source that provides electrical power for operation of the first object. The second 3D object model comprises a variety of data for the electrical power source, e.g., schematics, types of materials used for different components, strength of materials, etc. For instance, the second 3D object model can include data for a spring or other compliant portion of an object that keeps a battery in place in a battery compartment and maintains a reliable electrical connection, e.g., type of material used for the compliant area, strength of the material, etc. The second object 3D model can also include data for other parts of the battery compartment that can be fabricated from a softer material, e.g., soft plastic, rubber, etc., than the spring. Therefore, the second object 3D model data comprises pliability data for the conductive materials and tensile strength data for the nonconductive materials. At 404, the process 400 prints a 3D object based upon the integrated 3D printable model. The 3D printer 104 illustrated in FIG. 1 also prints components that are used to interact with the electrical power source 202 illustrated in FIG. 2. For instance, the 3D printer 104 prints the actuator 204, e.g., an on/off button, for interaction with the electrical power source 202.

The processes described herein may be implemented in a general, multi-purpose or special purpose processor. Such a processor will execute instructions, either at the assembly, compiled or machine-level, to perform the processes. Those instructions can be written by one of ordinary skill in the art following the description herein and stored or transmitted on a computer readable medium. The instructions may also be created using source code or a computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above. For example, a computer may be a personal computer ("PC"), laptop, smartphone, tablet device, set top box, or the like.

It is understood that the apparatuses, systems, computer program products, and processes described herein may also be applied in other types of apparatuses, systems, computer program products, and processes. Those skilled in the art will appreciate that the various adaptations and modifications of the aspects of the apparatuses, systems, computer program products, and processes described herein may be configured without departing from the scope and spirit of the present apparatuses, systems, computer program products, and processes. Therefore, it is to be understood that, within the scope of the appended claims, the present apparatuses, systems, computer program products, and processes may be practiced other than as specifically described herein.

I claim:

1. A method comprising:
   integrating a first 3D object model with a second 3D object model to generate an integrated 3D printable model, the first 3D object model modeling a first object that is passive, the second 3D object model modeling an electrical power source receptacle that operably connects to an electrical power source that provides electrical power for operation of the first object, the second 3D object model comprising an electrical pathway from the electrical power source receptacle to an actuator of the 3D object;
   printing a 3D object, with the actuator as a component, based upon the integrated 3D printable model such that the actuator interacts with the electrical power source to provide the electrical power to the first object; and
   connecting the actuator to the electrical power source using the electrical pathway.

2. The method of claim 1, wherein the second 3D object model further comprises an electrical component that conducts electricity through the electrical pathway.

3. The method of claim 1, wherein the actuator is an on/off switch.

4. The method of claim 1, wherein the second 3D object model is predetermined by a provider of the second 3D object model.

5. The method of claim 1, further comprising automatically determining the second 3D object model based upon a power source requirement of the first 3D object model.

6. The method of claim 1, wherein the electrical power source is a battery compartment.

7. A method comprising:
   integrating a first 3D object model with a second 3D object model to generate an integrated 3D printable model, the first 3D object model modeling a first object that is passive, the second 3D object model modeling a connector that operably connects to an external electrical power source that provides electrical power for operation of the first object, the second 3D object model comprising a conductive pathway from the connector to an actuator of the 3D object;
   printing a 3D object, with the actuator as a component, based upon the integrated 3D printable model such that the actuator interacts with the electrical power source to provide the electrical power to the first object; and
   connecting the actuator to the connector using the conductive pathway.

8. The method of claim 7, wherein the actuator is an on/off switch.

9. The method of claim 7, wherein the connector is a plug.

10. A method comprising:

integrating a first 3D object model with a second 3D object model to generate an integrated 3D printable model, the first 3D object model modeling a first object that is passive, the second 3D object model modeling an electrical power source receptacle that operably connects to an electrical power source that provides electrical power for operation of the first object, the second 3D object model comprising an electrical pathway from the electrical power source to an actuator of the 3D object that is printed as a component of the 3D object; and connecting the actuator to the electrical power source using the electrical pathway.

* * * * *